(12) United States Patent
Wang (10) Patent No.: US 7,814,099 B2
(45) Date of Patent: Oct. 12, 2010

(54) METHOD FOR RANKING AND SORTING ELECTRONIC DOCUMENTS IN A SEARCH RESULT LIST BASED ON RELEVANCE

(75) Inventor: Louis S. Wang, 4273 Manor Court Rd., Minnetonka, MN (US) 55345

(73) Assignees: Louis S. Wang, Minnetonka, MN (US); Daniel X. Wang, Minnetonka, MN (US)

(*) Notice: Subject to any disclaimer, the term of this patent is extended or adjusted under 35 U.S.C. 154(b) by 290 days.

(21) Appl. No.: 11/343,324

(22) Filed: Jan. 31, 2006

(65) Prior Publication Data

US 2007/0179930 A1 Aug. 2, 2007

(51) Int. Cl.
G06F 7/00 (2006.01)
G06F 17/30 (2006.01)

(52) U.S. Cl. .................. 707/730; 707/727; 707/723; 707/722; 707/705; 707/724

(58) Field of Classification Search .................. 707/1–4, 707/7, 705, 722, 723, 724, 727, 730
See application file for complete search history.

(56) References Cited

U.S. PATENT DOCUMENTS

| | | | | |
|---|---|---|---|---|
| 5,375,235 A | * | 12/1994 | Berry et al. | 707/5 |
| 5,685,003 A | * | 11/1997 | Peltonen et al. | 715/202 |
| 5,873,056 A | * | 2/1999 | Liddy et al. | 704/9 |
| 6,269,368 B1 | * | 7/2001 | Diamond | 707/6 |
| 6,285,999 B1 | | 9/2001 | Page | 707/5 |
| 6,560,600 B1 | | 5/2003 | Broder | 707/7 |
| 6,836,884 B1 | * | 12/2004 | Evans et al. | 717/140 |
| 6,871,202 B2 | | 3/2005 | Broder | 707/7 |
| 6,947,924 B2 | | 9/2005 | Bates et al. | 707/3 |
| 7,028,026 B1 | | 4/2006 | Yang et al. | 707/3 |
| 2001/0000356 A1 | * | 4/2001 | Woods | 707/3 |
| 2005/0071741 A1 | | 3/2005 | Acharya et al. | 715/208 |
| 2005/0240580 A1 | * | 10/2005 | Zamir et al. | 707/4 |
| 2005/0246328 A1 | | 11/2005 | Zhang et al. | 707/3 |
| 2006/0253437 A1 | * | 11/2006 | Fain et al. | 707/5 |

FOREIGN PATENT DOCUMENTS

EP 0810535 12/1997

(Continued)

OTHER PUBLICATIONS

Michael W. Berry, et al., "Understanding Search Engines: Mathematical Modeling and Text Retrieval," 2005.

(Continued)

Primary Examiner—Brent Stace
(74) Attorney, Agent, or Firm—Vidas, Arrett & Steinkraus (57) ABSTRACT

A method of evaluating the relevance rank of a target document in a search result list, includes the steps of assigning a basic credit to all keywords that are found in the target document; grouping keywords that are found in the target document; assigning extra value of credit to each keyword group; calculating the total value of credit of the whole target document; calculating the maximum value of credit of the whole target document, and calculating the relevance rank according to a comparison function of the total value of credit and the maximum value of credit for the target document.

13 Claims, 1 Drawing Sheet

FOREIGN PATENT DOCUMENTS

WO  02/057961  7/2002

OTHER PUBLICATIONS

S. Brin, et al., "The Anatomy of a Large-Scale Hypertextual Web Search Engine," http://www-db.stanford.edu/~backrub/google.html, Stanford University, 1999.

L. Barlow "How To Use Web Search Engines—Tips on using internet search sites like Google, alltheweb, and Yahoo.—p. 4—How Search Engines Work," http://www.monash.com/spidap4html The Spider's Apprentice, Monash Information Services, 2004.

Fluid Dynamics Software Corporation, "Sorting Results: How Relevance is Calculated," http://www.xav.com/scripts/search/help/1074.html, Aug. 2003.

Webconcerns, "ASP.Net Scripts—site crawler, indexer and search engine (p. 1 of 5)," http://www.webconcerns.co.uk/aspnet/searchb/default.asp, Sep. 2005.

K-Praxis, "Emerging Face of Information Search Part 2: Relevance Ranking of Results," http://www.k-praxis.com/archives/000111.html, Jul. 2004.

L. Zeltser et al., "High Precision Information Retrieval with Natural Language Processing Techniques," http://www.zeltser.com/info-retrieval/, 1997.

T. Viall untitled, http://www.ri.gov/downloads/search_wp.doc, State of Rhode Island, Jun. 2005.

Danny Sullivan, "How Search Engines Rank Web Pages," http://searchenginewatch.com/webmasters/print.php/34751_2167961 Jul. 31, 2003.

Laura Cohen, "Second Generation Searching on the Web," http://library.albany.edu/internet/second.html Mar. 7, 2006.

Teoma, "Adding a New Dimension to Search: The Teoma Difference is Authority," http://sp.teoma.com/docs/teoma/about/searchwithauthority.html, 2005.

A. Mercier and M. Beigbeder, "Fuzzy term proximity with boolean queries at 2006 TREC Terabyte task," in Proc. 15th Text REtreival Conference (TREC 2006), Gaithersburg, Maryland, USA, pp. 14-17, Nov. 2006.

Y. Rasolofo and J. Savoy, "Term proximity scoring for keyword-based retrieval systems." in Proceedings of the 25th European Conference on Information Retrieval Research (ECIR 2003), pp. 207-218, Apr. 2003.

* cited by examiner

FIG. 1

METHOD FOR RANKING AND SORTING ELECTRONIC DOCUMENTS IN A SEARCH RESULT LIST BASED ON RELEVANCE

FIELD OF INVENTION

The invention is directed to a ranking system for determining relative relevance of identified target documents to the search queries posed by searchers and listing the target documents in an order from highest to low relevance rank.

BACKGROUND OF THE INVENTION

In the past few decades, information technology (IT) has been developing very rapidly and has changed the way of storing and managing files and documents. Nowadays, more and more files and documents are stored in electronic form. These electronic documentations are possible to be stored in the electronic database and are searchable by using computerized searching technologies. As more and more searchable electronic documentations are available on either a local machine or on a remote machine within the local area network (LAN) or over the Internet, the quality of search results becomes more and more important to help the searchers find the right information they want.

The following documents pertain to web and database searching and results ranking techniques:

U.S. Patent Documents:

| | | |
|---|---|---|
| 6,285,999 | September 2001 | Page |
| 6,560,600 | May 2003 | Broder |
| 6,871,202 | March 2005 | Broder |

Other Publications:

Michael W. Berry, et al, "Understanding Search Engines: Mathematical Modeling and Text Retrieval," 2005

John Battelle, "The Search: How Google and Its Rivals Rewrote the Rules of Business and Transformed Our Culture," 2005.

S. Brin, et al, "The Anatomy of a Large-Scale Hypertextual Web Search Engine," http://www-db.stanford.edu/~backrub/google.html, Stanford University, 1999.

L. Barlow "How To Use Web Search Engines—Tips on using internet search sites like Google, alltheweb, and Yahoo.—Page 4—How Search Engines Work," http://www.monash.com/spidap4.html The Spider's Apprentice, Monash Information Services, 2004.

Fluid Dynamics Software Corporation, "Sorting Results: How Relevance is Calculated," http://www.xav.com/scripts/search/help/1074.html, August 2003.

Webconcerns, "ASP .Net Scripts—site crawler, indexer and search engine (page 1 of 5)," http://www.webconcerns.co.uk/aspnet/searchdb/default.asp, September 2005.

K-Praxis, "Emerging Face of Information Search Part 2: Relevance Ranking of Results," http://www.k-praxis.com/archives/000111.html, July 2004.

L. Zeltser et al "High Precision Information Retrieval with Natural Language Processing Techniques," http://www.zeltser.com/info-retrieval/, 1997

T. Viall, untitled, http://www.ri.gov/downloads/search_wp.doc, State of Rhode Island, June 2005.

Greg R. Notess, "Unusual Power Web Searching Commands," http://www.infotoday.com/online/nov03/OnTheNet.shtml Online, Vol. 27 No. 6, November/December 2003.

Many Internet search engines, such as Google™, Yahoo!® and Microsoft, Inc.'s msn.com™ have tried to improve the quality of the search results. Google, Inc. for example, adopted its famous PageRank™ algorithm technology to help searchers find most popular and important web sites by ranking the pages. The rank of a page rated by the PageRank™ algorithm is defined recursively and depends on the number of PageRank™ metric of all pages that link to it by hyperlink. A hyperlink to a page counts as a vote of support. A page that is linked by many pages with high rank receives a high rank itself. The PageRank™ algorithm considers that the importance of a page is determined by the number and the rank of the pages that link to it.

However, the PageRank™ algorithm has two major disadvantages. The first one is that it favors old pages because a new page, even a very good one, will not have many links or citations unless it is part of an existing and high ranking site. Therefore, it does not treat all web sites and web pages equally. Secondly, in most cases, searchers do not care about how important or popular a web site is. They just want get the results that are most relevant to their search query. In the case of a desktop search, the PageRank™ algorithm would not work because unlike web pages, there are no back links available for most files stored in the local computer, such as resumes, letters and etc.

Relevancy is normally considered to be the appropriateness of a document to a searcher's need. One of the most common methods for researching relevancy searching and ranking is the vector space model. Using a vector space information retrieval (IR) model, a term-by-document matrix is constructed. The columns of the matrix are the document vectors and the rows of the matrix are considered the term vectors. The cosine of the angle between the query vector and the document vectors is commonly used to measure similarity for query matching. The vector space model has a significant advantage over traditional indexing methods for the searchers, because the retrieved target documents can be ranked, thus almost eliminating the no result in exact-match systems. However, because the vector space model starts with a term-by-document matrix, it inevitably losses the information of whether search terms are standalone or grouped together in the first place. Therefore, like other methods, it only processes the individual search terms and has no way to handle the cases when the search terms are grouped together in the target document.

SUMMARY OF THE INVENTION

This invention is directed to a method for ranking documents located in a search result list according to their likely relevance. Various aspects of this invention provide methods for ranking and sorting the target documents, the searchable electronic documents in a search result list.

The invention considers that relative relevance to the search query is not a function of a document's importance or popularity, but rather a function of the occurrence and grouping of keyword terms or their equivalents within the body of the document. By focusing on the content of the document, the invention overcomes the above disadvantages of the PageRank based ranking system.

In one aspect the invention is a method of evaluating the relevance rank of a target document in a search result list. The method comprises the steps of:

assigning a basic credit to all keywords that are found in the target document;

grouping keywords that are found in the target document;

assigning extra value of credit to each keyword group;

calculating the total value of credit of the whole target document;

determining a maximum value of credit of the whole target document and calculating the relevance rank of the target document.

A further aspect of the invention pertains to techniques for determining the extra credit value assigned to each keyword in a keyword group in the target document and to the determination of the document credit by summing the keyword credits and the keyword group credits in the target document. Calculation of the maximum value of a target document as the basis for determining relevance based on constitutes still further aspects of the invention.

Another aspect of this invention is to rank the target document based on the percentage by dividing the document credit over document maximum credit. Therefore the relevance rank of the target document is an averaged frequency of occurrence of all keywords and keyword groups with different value of credit. By using this method, the most relevant documents to the search query receive the highest relevance rank.

This invention greatly improves the quality of the electronic document search results by analyzing the relevance between the search query and the target documents. It can be used to search any searchable files and documents, such as web pages on the World Wide Web and files on the desktop/laptop computers.

DETAILED DESCRIPTION OF ILLUSTRATIVE EMBODIMENTS

The following detailed description contains many aspects that are for the purposes of illustration, anyone skilled in the art will understand that many variations and alterations to those aspects are within the scope of the invention. Therefore, the following embodiments of the invention are set forth without any loss of generality to the claimed invention.

All published documents, including all US patent documents, mentioned anywhere in this application are hereby expressly incorporated herein by reference in their entirety. Any copending patent applications, mentioned anywhere in this application are also hereby expressly incorporated herein by reference in their entirety.

The inventive method begins with a set of target documents identified as containing all the keyword terms, or equivalent terms, that have been specified a search query. These target documents may be identified by searching at least the visible text in a collection of full text documents, in abstract databases and/or in indexing databases, for instance web crawler databases. Any electronic documents that are stored and processed electronically by computerized machine can be searched in this way to generate the results set.

The invention is particularly beneficial for use in a search engine operating on the Internet. At least in Internet searching embodiments it may be useful to exclude comment tags, meta data and/or alt text from the searched document information, as only visible text is likely to be considered pertinent by the reader and because hidden text frequently is used to generate hits on web documents whose visible content no connection to the searcher's intent. However, in other embodiments hits generated on hidden text may be included.

The invention operates on the results set to determine a relevance rank to each target document based on relevance between the search query and the target document content. The documents can then be listed in the order of the relevance rank, suitably from the highest to the lowest.

To determine the relevance rank of a document, each keyword in a target document is assigned a value of credit. For this purpose, the query is cleaned, to delete unsearchable words in the query, e.g. "the," "a," "of," "in," "and," "or," and the like, according to known practice. Punctuation such as quotation marks, apostrophes, hyphens, commas, colons and semicolons, and the like, is also stripped. In some embodiments hyphenated words may be joined rather than separated. The keywords are those words from the searcher's query that remain after such cleaning has been performed.

The contents of the target document being examined are similarly cleaned to eliminate unsearchable words, producing a list of potential keywords in the order they occur in the target documents text. When a match is identified the credit value is assigned. Words in the target document that do not match a keyword receive zero credit. The keyword credit may be, for instance, assigned a value of one (1) for each occurrence of a keyword.

For purposes of determining a match to a keyword in a target document, the inventive method may employ an exact match requirement. However, in some embodiments of the invention, a dictionary may be consulted to ascertain alternate word forms to be considered equivalent to a particular keyword. Alternate word forms include plurals, verb tenses, and the like.

In another embodiment, a thesaurus or other synonym list may also be consulted to determine alternate words that may be considered a match to the keyword. In the case of a match to a word on a synonym list, the credit value assigned to the synonym could be reduced from that of an exact and/or dictionary equivalent match.

According to an embodiment of the present invention, the occurrences of keywords next to each in the target document are also grouped together. All grouped keywords receive an extra credit value according to an extra credit algorithm. Grouped keywords with more keywords are assigned a higher extra credit value than those with fewer keywords. When a keyword group contains more keywords than the number of keywords in search query, the extra credit assigned to each keyword in this group would be the same as if it is in a group with same number of keywords in the search query. The total credit for each keyword in the target document then provides a document credit for the particular document as the sum of the total keyword credits and extra credits determined for the target document.

In an example of the keyword extra credit assignment, each occurrence of two keywords grouped next to each other assigns an additional value of credit to the keywords. Occurrences of three keywords grouped next to each other are then assigned still further additional credit values, and so on. This approach is similar to a Poker game, where an "A" in "AAAA" or "JQKA" group has much more power than a standalone "A." This approach, which is assigning different values of credits to the keywords in groups with different numbers of adjacent keywords in the target document, is a key feature of this invention. Keywords do not have to be in the same order as they are in the search query. A mathematical algorithm is utilized to evaluate the value of credit for each keyword in groups of two or more.

After the values of the credits of all keywords in the target document have been identified, the document credit is evaluated by summing all values of the credits. The document maximum credit is evaluated by multiplying the number of the words in the cleaned target document by the value of credit of a keyword in a group having the same number of keywords in a search query.

The relevance rank of the target document is then evaluated by comparing the document credit to the maximum document credit for that document. The comparison function suitably may be a simple percentage or some other more complex calculation may be used. When the relevance rank for each of the target documents is determined the results may be returned to the searcher in rank order.

When a searcher begins to search a document, he/she types a query in the search box and clicks a search button to start searching. The search query can be a phrase, a complete sentence or just a bunch of keywords. Depending on selected search criteria, the search machine then returns a list of all documents that contain all keywords in the search query back to the searcher. Here, we define the target documents to be all documents that are in the search result list and treat all words in the search query as keywords.

In each target document, the keywords found will either stand alone in the document, i.e. not next to any other keywords, or they will be grouped with other keywords. For example, relating to dealers of Lexus® cars, if "Lexus Car Dealer" is a search query, the target document may contain standalone keywords such as "Lexus," "Car," or "Dealer," or may have grouped keywords such as "Lexus Car Dealer," "Lexus Car," "Car Dealer," or "Lexus Dealer." The grouped keywords do not have to be in the same order as they are in the search query. Therefore, "Car Lexus" will also be considered as a keyword group.

The following example is just for illustrating how to get mathematical algorithm to evaluate value of credit for each keyword in the target document. Different initial values of credits can be chosen and assigned. The reciprocal function $f(x)=1/x$ is used in this example. Other mathematical functions, including linear, polynomial, rational, exponential and logarithmic functions, and combinations thereof, can be also adopted to evaluate the additional value of credit for each grouped keyword.

Before the illustration, we define the following notations that will be used in the example.

| | Notation |
|---|---|
| N | number of keywords in a search query |
| M | number of words in a target document |
| $K_1 K_2 \ldots K_N$ | phrase of the search query where $K_1$, $K_2$, ... and $K_N$ represent each individual keyword in the search query. |
| Type n Group | a keyword group that contains n keywords, where $n \leq N$; when $n > N$, all Type n Groups are defined to be Type N Group |
| WC(n) | the total value of credit that a keyword in Type n Group receives |
| $M_n$ | the total number of Type n Group keywords in target document |
| DC | the value of credit that a target document receives |
| MaxDC | the maximum value of credit that a target document receives |
| Rel | the relevance rank that a target document receives |

In this example, we assume that the phrase in the search query contains N words. Because we treat all words in the search query, after cleaning, to be keywords, the number of keywords in the search query is N. Where n is greater than 1, a keyword in a group with n members is also in a group with (n−1) members. For purposes of the present invention, however, a reference to "a keyword in a Type n Group," means that the keyword occurs in a unique grouping that has a maximum of n keywords. For example, if we have a keyword group of $K_1 K_2 K_3$, then the specific occurrence of $K_2$ would be in a Type 3 Group. Occurrences of the keyword $K_2$ at other locations in the document might be found ungrouped or in groups where n is shorter or longer, for instance in a Type 2 Group of $K_1 K_2$ or of $K_2 K_3$. In each occurrence the value accorded to $K_2$ is determined according to the maximum size of the particular grouping in question.

The grouped keywords, such as $K_1 K_2$; $K_1 K_2 K_3$; $K_3 K_2 K_1$; or $K_1 K_3 K_6$; do not have to be consecutive and do not have to be in the same order as they are in the phrase of the search query.

For purposes of this example, the maximum number of the keywords in any group is taken as the number of keywords in the search query. Therefore, when the number of the keywords in a Type n group is greater than the number of keywords in the search query, then we define its group to be a Type N group, where N is the number of keyword in search query. Therefore, n is never greater than N.

Also in this example, all keywords found in the target document are assigned one (1) credit. This is an arbitrary assignment and a different value may also be used. That is, WC(1)=1. Each keyword that is in Type 2 Group is assigned an additional credit. The value of the extra credit can be calculated by the percentage of increasing number of the keywords from Type 1 Group to Type 2 Group. That is, WC(2)=WC(1)+(2−1)/1. Similarly, WC(3)=WC(2)+(3−2)/2 and so on. Then we are able to get WC(n)=WC(n−1)+1/(n−1), where $2 \leq n \leq N$.

We list the results as the following equations:

$$WC(1)=1 \qquad (1)$$

$$WC(2)=WC(1)+1 \qquad (2)$$

$$WC(3)=WC(2)+\tfrac{1}{2} \qquad (3)$$

$$WC(4)=WC(3)+\tfrac{1}{3} \qquad (4)$$

$$\ldots$$

$$WC(n)=WC(n-1)+1/(n-1) \qquad (n)$$

$$\ldots$$

$$WC(N-1)=WC(N-2)+1/(N-2) \qquad (N-1)$$

$$WC(N)=WC(N-1)+1/(N-1) \qquad (N)$$

When the number of keywords in the search query N is very large, the absence of a keyword will not be very important. Therefore, $$\lim_{N \to \infty} WC(N) = \lim_{N \to \infty} WC(N-1)$$

By adding equation (1) to equation (n) and simplifying the resulted equation, we get the value of credit that each keyword in a Type n Group receives:

$$WC(n) = 1 + \sum_{i=1}^{n-1} \frac{1}{i} \text{ where } 2 \leq n \leq N$$

$M_n$ is the total number of Type n Group keywords in a target document. We evaluate the value of credit of the target docu ment DC by summing values of credits of all keywords in the target document.

$$DC = \sum_{n=1}^{N} M_n WC(n) \text{ or}$$

$$DC = M_1 + \sum_{n=2}^{N}\left[M_n\left(1 + \sum_{i=1}^{n-1}\frac{1}{i}\right)\right]$$

The document maximum credit MaxDC can be calculated as $$\text{Max}DC = M\left(1 + \sum_{i=1}^{N-1}\frac{1}{i}\right)$$

Finally, the relevant rank, Rel, of a target document can be expressed as $$Rel = \frac{DC}{\text{Max}DC} \text{ or}$$

$$Rel = \frac{M_1 + \sum_{n=2}^{N}\left[M_n\left(1+\sum_{i=1}^{n-1}\frac{1}{i}\right)\right]}{M\left(1+\sum_{i=1}^{N-1}\frac{1}{i}\right)}$$

Figure 1:
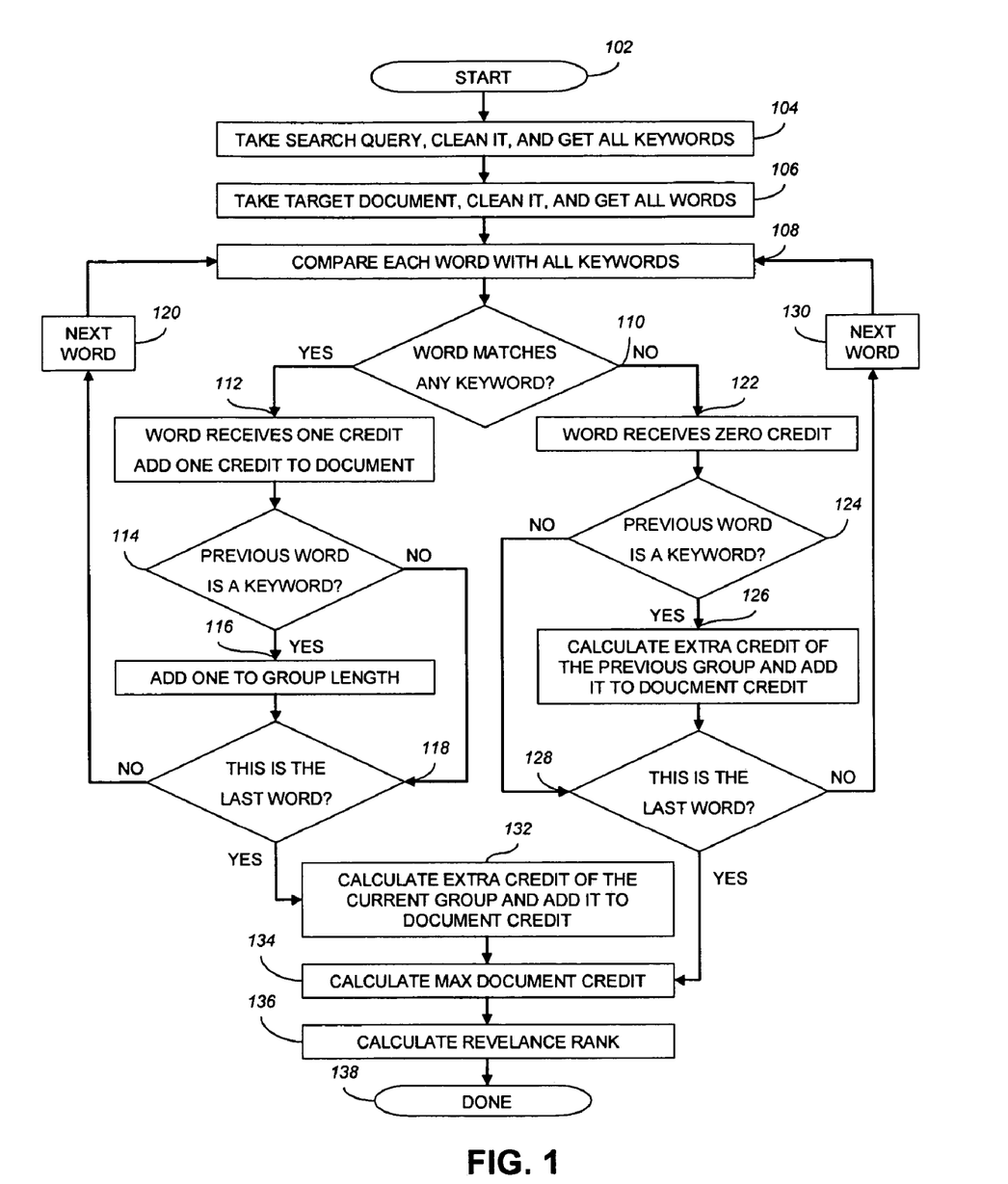
FIG. 1 illustrates the flowchart of calculating the relevance rank of a target document by using a computerized machine.

The above mathematical algorithm for evaluating the relevance rank of a target document can be easily implemented by computerized technologies. FIG. 1 illustrates the flowchart of calculating the relevance rank of a target document by using a computerized machine.

After a searcher enters a search query in the search text box and clicks a search button, the computerized machine searches a database or a document list to find the target documents that contain keywords and lists them in a search result list. Then the process in the FIG. 1 starts from the start block 102.

The process proceeds to a block 104, where the machine takes search query, cleans it by removing all unnecessary symbols and words, such as ":", ";", "and" and "or" and splits the search query phrase to get all individual keywords.

The process proceeds to a block 106, where the machine takes a target document from the search result list, cleans it by removing all unnecessary symbols and words, such as ":", ";", "and" and "or" and splits the target document text to get all individual words.

The process proceeds to a block 108, where the machine takes a word from target document and compares it with all keywords. The machine processes the word one by one from the first one to the last.

The process proceeds to a block 110, where if the machine finds any keyword match the word, the process proceeds to a block 112, otherwise the process proceeds to a block 122.

At the block 112, the word is a keyword and is then assigned one credit. Accordingly, the document credit increases by one.

From the block 112, the process proceeds to a block 114, where if the previous word also matches a keyword, the process proceeds to a block 116, otherwise the process proceeds to a block 118.

At the block 116, the group length increases by one. The group length is a variable for counting the number of keywords in a keyword group and is used for calculating the group credit later.

From the block 116 as well as the block 114, the process also proceeds to a block 118. At the block 118, if the current word is the last one in the target document, the process proceeds to a block 132, otherwise, the process proceeds to a block 120 where the process proceeds to a block 108 and starts to process the next word.

At the block 132, the machine calculates the extra value of credit of the current keyword group by using the group length. If the group length is n and n is not less than the length of search query N, then the extra credit that each word within this group receives is $1+\frac{1}{2}+\frac{1}{3}+ \ldots +1/(n-1)$. That is $$\sum_{i=1}^{n-1}\frac{1}{i}$$

where $2 \leq n \leq N$. If the group length n is greater than N, then the extra credit that each word within this group receives is $1+\frac{1}{2}+\frac{1}{3}+ \ldots +1/(N-1)$. That is $$\sum_{i=1}^{N-1}\frac{1}{i}.$$

Therefore the total extra value of credit for the whole group will be $$n\sum_{i=1}^{n-1}\frac{1}{i}$$

if $2 \leq n \leq N$ or $$n\sum_{i=1}^{N-1}\frac{1}{i}$$

if n>N. This extra group credit is then added to the total value of the credit of the target document. Then the process proceeds to a block 134.

At the block 122, the word is not a keyword and is then assigned zero credit.

From the block 122, the process proceeds to a block 124, where if the previous word also matches a keyword, the process proceeds to a block 126, otherwise the process proceeds to a block 128.

At the block 126, the machine calculates the extra value of credit of the previous keyword group by using its group length. The previous keyword group is the one that right before this non-keyword word. If the length of the previous group is n, then the number of keywords in this group is n. The extra group credit is calculated in the same way as that in block 132. It is then added to the total value of the credit of the target document. Then the process proceeds to a block 128.

From the block 126 as well as the block 124, the process proceeds to a block 128. At the block 128, if the current word is the last one in the target document, the process proceeds to a block 134, otherwise, the process proceeds to a block 130 where the process proceeds to a block 108 and starts to process the next word.

From the block 132 as well as the block 128, the machine has processed all words in the target document and obtained the total value of the credit that the target document receives. Then the process proceeds to a block 134. At the block 134, the machine calculates the maximum value of credit that the target document receives by multiplying the number of words M in the target document and the value of credit of a keyword in the group with the same number of keywords in a search query $$1 + \sum_{i=1}^{N-1} \frac{1}{i}$$

in this target document.

From the block 134, the process proceeds to a block 136, where the machine calculate the relevance rank of the target document by dividing the total value of credit of the target document over its maximum value of credit. The process of calculating the relevance rank of a target document is done and process ends at block 138 and may start to process the next target document.

The above process illustrated in FIG. 1 is easily implemented by almost all computer languages, such as C#, C++, C+, C, VB.NET, VBScript, Visual Basic, FORTRAN and Assembler. The following example is a software implementation by using Microsoft C# language. All italic fonts are the comments about each code block. Any person skilled in the art will easily understand this example.

```
// After a searcher enters search query and clicks a button. The search query is stored in
the string txtSearchQuery.
protected void ClickSearch(Object sender, System.EventArgs e)
{
    // Use the function Clean ( ) to remove unnecessary symbols and words.
    string strSearchQuery = Clean(txtSearchQuery.Text.Trim( ));
    // Use white space as the splitter to get individual keywords from the string
strSearchQuery and store them in the array keyword[i]
    string[ ] keyword = null;
    char[ ] splitter = {' '};
    keyword = strSearchQuery.Split(splitter);
    // Count number of valid keywords in the search query
    int N = keyword.Length;
    // The target document is stored in a string variable txtDoc
    // Use the function Clean ( ) to remove unnecessary symbols and words.
    string strDoc = Clean(txtDoc.Trim( ));
    string[ ] word = null;
    word = strDoc.Split(splitter);
    // Count number of words in the target document
    int M = word.Length;
    // Define an integer array wordCredit for storing value of credit of each keyword in
the target document
    int[ ] wordCredit = new int[M];
    // Define a double variable docCredit for storing document value of credit and set its
initial value to zero
    double docCredit = 0.00F;
    // Define an integer variable groupLength for storing the number of keywords in a
group and set its initial value to one
    int groupLength = 1;
    // Evaluate the document credit from the word 0 to word M−1
    for (int m = 0; m < M; m++)
    {
        int n = 0;
        while (n < N && wordCredit[m] == 0)
        {
            // If a word is one of the keywords
            if (word[m].ToLower( ).Trim( ) == keyword[n].ToLower( ).Trim( ))
            {
                // If a word is one of the keywords, then set the value of the credit of this word
to one
                wordCredit[m] = 1;
                // Accordingly, the document credit increases by one
                docCredit++;
                // If the previous word is also a keyword
                if (m > 0 && wordCredit[m − 1] == 1)
                {
                    // If the previous word is also a keyword, the number of keywords in a group
increases by one
                    groupLength++;
                }
            }
            else
                // If a word is not one of the keywords, then set the value of the credit of this
word is zero
                wordCredit[m] = 0;
            // Repeat this process until all keywords have compared with this word or find
one of the keyword that matches this word
            n++;
        }
```

-continued

```
    // If this word is not a keyword and the previous word is a keyword or
    // the word is a keyword and is the last the word in the document
        if (groupLength > 1 && ((wordCredit[m−1] == 1 && wordCredit[m] == 0) || (wordCredit[m] == 1 && m == M − 1)))
        {
            // if group length is greater than N, then set group length to N
            if (groupLength > N)
                groupLength = N;
            // Count the group credit for this keyword group
            for (double i = 1; i < groupLength; i++)
                docCredit += groupLength*((double)1 / i);
            // Reset groupLength to one
            groupLength = 1;
        }
    }
    // Evaluate the maximum word credit in the target document
    double max WordCredit = 1;
    for (int j = 1; j < N; j++)
        maxWordCredit += (double)1/j;
    double maxDocCredit = M * maxWordCredit;
    // Evaluate the DocRank
    double docRank = (double)docCredit / maxDocCredit;
}
// Remove unnecessary symbols and words
string Clean(string strOriginal)
{
    string strClean;
    // replace unnecessary symbols with space
    strClean = strOriginal.Replace("+", " + ");
    strClean = strClean.Replace("−", " − ");
    strClean = strClean.Replace("*", " * ");
    strClean = strClean.Replace("(", "");
    strClean = strClean.Replace(")", "");
    strClean = strClean.Replace("[", "");
    strClean = strClean.Replace("]", "");
    strClean = strClean.Replace("{", "");
    strClean = strClean.Replace("}", "");
    strClean = strClean.Replace(" at ", " ");
    strClean = strClean.Replace(" and ", " ");
    strClean = strClean.Replace(",", "");
    strClean = strClean.Replace(".", "");
    strClean = strClean.Replace(";", "");
    strClean = strClean.Replace(":", "");
    strClean = strClean.Replace("?", "");
    strClean = strClean.Replace("!", "");
    // Return the clean result
    return strClean;
}
```

As previously mentioned, keyword matches may be made on the basis of a list of alternate word forms, for instance a dictionary or on the basis of a synonym list, such as a thesaurus. For instance, Minnesota and MN would be recognized as alternate word forms. In another example for the key word "mystery," documents containing the words "mysteries," "mystify" or "mysterious" may all be credited as a match using a database of alternate word forms. When extended to synonyms, "mystic," "occult," "secret," "unknown," and/or "puzzle" may be credited as at least partial matches for "mystery." In computing a document's relevance rank, a departure from an identical match may be reflected in a discounted credit. For instance in the example of the keyword "mystery," an occurrence of "mysteries" may be credited one credit as a plural form of an exact match; an occurrence of "mystic" might be credited 0.9 credits as a related adjective form; and occurrences of "secret" or "puzzle" might each be credited 0.50 as synonyms. The fractional credit could be based upon an arbitrarily assigned factor for different types of matches, or it may be assigned according to a probability factor that the terms are used as synonyms based on usage analysis from a sampling of literature in a particular language. Such a sampling could be obtained from selected literature sources, a sampling of documents on the Internet or any other source.

Grouping of keywords is preferably determined on the basis of adjacency of keyword terms. However, in other embodiments a close proximity basis could be used as the basis for grouping. Each key word in the document is considered as a group with the next sequential keyword that occurs in the document. The shorter the distances between keywords, the more relevant the target document will be. We could assign a fraction of basic keyword credit based on the distance between keywords. For example, if there are x non-keywords between two keywords and the basic credit of a keyword is c, we could add $c/(x+1)$ credit to the total document credit. The further that two keywords are apart, the less relevant they will be to the search query so the less credit that is assigned for the proximity group. For this system the maximum document credit assumes that the keywords are all adjacent so x is 0 for each searchable word found in the document. Again, besides the reciprocal function used in this example, other mathematical functions, including linear, polynomial, rational, exponential and logarithmic functions, and combinations thereof, can be also adopted to evaluate the value of credit for word proximity. This method can handle all proximity situations, no matter how many keywords and non-keywords are involved and how far the keywords are apart.

In a further alternative, a relevance rank that reflects both adjacency and proximity of keywords by assigning extra credits on the basis of both adjacency grouping and proximity grouping.

The above examples and disclosure are intended to be illustrative and not exhaustive. These examples and description will suggest many variations and alternatives to one of ordinary skill in this art. All these alternatives and variations are intended to be included within the scope of the claims, where the term "comprising" means "including, but not limited to." It will be clear to any person skilled in the art that the above embodiments may be altered in many ways without departing from the scope of the invention. Therefore, the scope of the invention should be determined by the following claims and their legal equivalents.

The invention claimed is:

1. A method comprising:
running a query comprising at least two keywords in a documents database,
producing a search result list of target documents satisfying the query, and
providing said search result list to a computer program running in a computer,
wherein as to each target document in the search results list said computer program performs the steps of:
assigning a basic value of credit for each occurrence of a keyword that is found in the target document;
identifying keyword groups in the target document by grouping keywords that are found in the target document without regard to keyword order according to
a proximity relationship that groups each occurrence of a keyword with the next sequential occurrence of a keyword in the target document,
an adjacency relationship in the target document applied to all keywords in the query, or
both a said proximity relationship and a said adjacency relationship;
assigning an extra value of credit to each occurrence of a keyword group identified in the target document;
calculating a total value of credit of the target document, which total value of credit comprises summing each said basic value of credit assigned for an occurrence of a keyword in the target document and each said extra value of credit assigned for an occurrence of a keyword group in the target document;
determining a maximum value of credit of the target document; and
calculating a relevance rank according to a comparison function of the total value of credit and the maximum value of credit for the target document,
and wherein the target document has a total number of words, said search query has a number of keywords,
the step of assigning an extra value of credit to each occurrence of a keyword group comprises assigning an extra keyword value of credit for each keyword in each keyword group, and
the step of determining a maximum value of credit of the target document comprises multiplying
the total number of words in the target document by
the sum of the basic value of credit of a keyword and
the extra keyword value of credit assigned to a keyword in a keyword group with the same number of keywords as the search query.

2. The method of claim 1, wherein calculating the relevance rank for the target document comprises dividing the total value of credit of the target document by said maximum value of credit.

3. The method of claim 1 wherein said assigning an extra value of credit to each keyword in said keyword group uses a reciprocal, linear, polynomial, rational, exponential or logarithmic mathematical function.

4. The method of claim 3 wherein said mathematical function, for a group length of a value n and a number of keywords of a value N the query, assigns extra value of credit for each word within the group as equal to $$\sum_{i=1}^{n-1} \frac{1}{i} \text{ if } 2 \le n \le N \text{ or } \sum_{i=1}^{N-1} \frac{1}{i} \text{ if } n > N.$$

5. The method of claim 1 wherein the keywords are grouped only according to a said adjacency relationship.

6. The method of claim 1 wherein the keywords are grouped only according to a said proximity relationship.

7. The method of claim 1 wherein the keyword groups are assigned extra values of credit only according to both a said proximity relationship and a said adjacency relationship.

8. The method of claim 1 wherein the target document has a number of searchable words and the maximum value of credit of the target document is a function of the number of searchable words in the target document and of the number of keywords in the query.

9. A method comprising:
running a query comprising at least two keywords in a documents database,
producing a search result list of target documents satisfying the query, and
providing said search result list to a computer program running in a computer,
wherein as to each target document in the search results list said computer program performs the steps of:
assigning a basic value of credit for each occurrence of a keyword that is found in the target document;
identifying keyword groups in the target document by grouping keywords that are found in the target document without regard to keyword order according to
a proximity relationship that groups each occurrence of a keyword with the next sequential occurrence of a keyword in the target document,
an adjacency relationship in the target document applied to all keywords in the query, or
both a said proximity relationship and a said adjacency relationship;
assigning an extra value of credit to each occurrence of a keyword group identified in the target document;
calculating a total value of credit of the target document which total value of credit comprises summing each said basic value of credit assigned for an occurrence of a keyword in the target document and each said extra value of credit assigned for an occurrence of a keyword group in the target document;
determining a maximum value of credit of the target document; and
calculating a relevance rank according to a comparison function of the total value of credit and the maximum value of credit for the target document, and wherein for a keyword group having a group length of n and a number of keywords N in the query, the total extra value of credit provided by the keyword group is $$n\sum_{i=1}^{n-1}\frac{1}{i} \text{ if } 2 \leq n \leq N \text{ or } n\sum_{i=1}^{N-1}\frac{1}{i} \text{ if } n > N.$$

10. The method of claim 9 wherein the target document has a number of words of a value M and the maximum value of credit of the target document is $$M\left(1+\sum_{i=1}^{N-1}\frac{1}{i}\right).$$

11. A method comprising:
running a query comprising at least two keywords in a documents database,
producing a search result list of target documents satisfying the query, and
providing said search result list to a computer program running in a computer,
wherein as to each target document in the search results list said computer program performs the steps of:
assigning a basic value of credit for each occurrence of a keyword that is found in the target document;
identifying keyword groups in the target document by grouping keywords that are found in the target document without regard to keyword order according to
a proximity relationship that groups each occurrence of a keyword with the next sequential occurrence of a keyword in the target document,
an adjacency relationship in the target document applied to all keywords in the query, or
both a said proximity relationship and a said adjacency relationship;
assigning an extra value of credit to each occurrence of a keyword group identified in the target document;
calculating a total value of credit of the target document, which total value of credit comprises summing each said basic value of credit assigned for an occurrence of a keyword in the target document and each said extra value of credit assigned for an occurrence of a keyword group in the target document;
determining a maximum value of credit of the target document; and
calculating a relevance rank according to a comparison function of the total value of credit and the maximum value of credit for the target document,
and wherein the target document has a total number of words of a value M, the search query has a number of words of a value N, each keyword group has a group length of a value n, each keyword group is taken as a Type n Group wherein Type n is a value equal to n when n≦N and Type n is equal to N when n>N, for each Type n, the target document has a total number of Type n Group keywords of a value $M_n$ and the relevance rank is a value Rel calculated according to the formula:

$$Rel = \frac{M_1 + \sum_{n=2}^{N}\left[M_n\left(1+\sum_{i=1}^{n-1}\frac{1}{i}\right)\right]}{M\left(1+\sum_{i=1}^{N-1}\frac{1}{i}\right)}.$$

12. A computer programmed with a database search engine that performs the following steps in response to a search query from a user:
the computer providing a search result list of target documents conforming to a search query, and,
as to each target document in the search result list, the computer:
assigning a basic value of credit for each occurrence of a keyword that is found in the target document;
identifying keyword groups in the target document by grouping keywords that are found in the target document without regard to keyword order according to
a proximity relationship that groups each occurrence of a keyword with the next sequential occurrence of a keyword in the target document,
an adjacency relationship in the target document applied to all keywords in the query, or
both a said proximity relationship and a said adjacency relationship;
assigning an extra value of credit to each occurrence of a keyword group identified in the target document;
calculating a total value of credit of the target document, which total value of credit comprises summing each said basic value of credit assigned for an occurrence of a keyword in the target document and each said extra value of credit assigned for an occurrence of a keyword group in the target document;
determining a maximum value of credit of the target document; and
calculating a relevance rank according to a comparison function of the total value of credit and the maximum value of credit for the target document,
and wherein the target document has a total number of words, said search query has a number of keywords,
the step of assigning an extra value of credit to each occurrence of a keyword group comprises assigning an extra keyword value of credit for each keyword in each keyword group, and
the step of determining a maximum value of credit of the target document comprises multiplying
the total number of words in the target document by
the sum of the basic value of credit of a keyword and the extra keyword value of credit assigned to a keyword in a keyword group with the same number of keywords as the search query.

13. A programmed computer as in claim 12 wherein the search result list is provided to a display in order of said relevance rank.

* * * * *